United States Patent [19]
Akiyama et al.

[11] Patent Number: 6,018,336
[45] Date of Patent: *Jan. 25, 2000

[54] COMPUTER SYSTEM HAVING DIGITIZING TABLET

[75] Inventors: Kazuhiro Akiyama; Ryoichi Sebori, both of Tokyo, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/800,030

[22] Filed: Feb. 13, 1997

[30] Foreign Application Priority Data

Jul. 25, 1996 [JP] Japan .................................. 8-196201

[51] Int. Cl.[7] .................................................. G09G 5/00
[52] U.S. Cl. ...................................... 345/173; 345/145
[58] Field of Search ................................ 345/173, 174, 345/356, 145, 146, 352, 353, 354, 902; 395/358

[56] References Cited

U.S. PATENT DOCUMENTS

| | | | |
|---|---|---|---|
| 4,831,568 | 5/1989 | Ito | 364/709.11 |
| 4,903,012 | 2/1990 | Ohuchi | 340/709 |
| 5,432,531 | 7/1995 | Calder et al. | 345/173 |
| 5,587,559 | 12/1996 | Fleck et al. | 178/18 |
| 5,612,719 | 3/1997 | Beernink et al. | 345/173 |
| 5,668,966 | 9/1997 | Ono et al. | 345/356 |

FOREIGN PATENT DOCUMENTS 6-126336  5/1994  Japan .
7-334293  12/1995  Japan .

*Primary Examiner*—Xiao Wu
*Assistant Examiner*—Ronald Laneau
*Attorney, Agent, or Firm*—Finnegan, Henderson, Farabow, Garrett & Dunner, L.L.P.

[57] ABSTRACT

When a pressure sensitive tablet is tapped with a touch pen, input coordinate values x and y, corresponding to the position tapped with the pen, are sent to a tablet driver from a tablet controller. Event data is added to the coordinate values x and y sent to the tablet driver by a pointing management portion to be sent to an operating system. If the coordinate values x and y sent from the tablet driver are included in an area showing a switch of a mode displayed on a screen, the coordinate values x and y are sent to a tablet mode switching tool by a pen service portion of the operating system.

15 Claims, 4 Drawing Sheets

COMPUTER SYSTEM HAVING DIGITIZING TABLET

BACKGROUND OF THE INVENTION

The present invention relates to a portable information apparatus having a pressure sensitive tablet, such as a pen computer, and more particular to a computer system having a function of emulating mouse functions of a general-purpose OS (Operating System) on a pressure sensitive tablet.

In recent years, there has been widely used a general-purpose operating system having a GUI (Graphical User Interface) such as a computer system having Windows 95, made by Microsoft Cooperation, mounted. The computer system having such a general-purpose OS mounted supports various kinds of mouse functions in consideration of various usage. In the general mouse, at least a pair of right and left-side buttons are provided. Then, these buttons and a coordinate input portion are combined, so that various kinds of mouse functions can be realized in the general-purpose OS.

As a recent trend, various kinds of portable computer systems having the general-purpose OS mounted have been developed.

In such a portable computer system, it is possible to emulate a drag function of the mouse by a pen-touch operation on the tablet in using an integrated display/input device (transparent typed pressure sensitive tablet) as a user's interface. However, such a pressure sensitive tablet performs no operation other than a tap (touch onto the tablet) as operation and transmission means. Due to this, it is impossible to emulate functions other than the above-mentioned drag function, for example, a mouse cursor moving function for moving only a mouse cursor, and a mouse function such as a short-cut by a right-side mouse button click.

In other words, it is impossible to emulate the moving function for moving the mouse cursor (mouse pointer) and the mouse function, which corresponds to the right-side button click even if the user executes the same function as the case using the mouse having two click buttons.

Conventionally, Japanese Patent Publication (Kokai) No. 7-334293 discloses the techniques for managing of all processes relating to an application such as a display, a discrimination, storage, etc, by using the mouse button in order to emulate the mouse button. However, as mentioned above, it is impossible to emulate functions other than the above-mentioned drag function, for example, the mouse cursor moving function and the mouse function corresponding to the right-side button of the mouse buttons.

BRIEF SUMMARY OF THE INVENTION

An object of the present invention is to provide a computer system having a tablet wherein a plurality of kinds of mouse functions, which a general-purpose OS has, can be emulated by only an operation on the pressure sensitive tablet.

According to a first aspect of the present invention, there is provided a mouse function emulation method, applied to a computer system having a pressure sensitive tablet to execute a general-purpose operating system, comprising the steps of: detecting a tap on the pressure sensitive tablet performed by a pen; determining presence of a mode selection in accordance with position data of the detected tap; adding, when the mode selection is present, event data, showing a predetermined mouse function and corresponding to the selected mode, to position data of a tap to be detected continuously after the detected tap; and executing a process in response to input position data by the general-purpose operating system in accordance with the event data to emulate the mouse function.

According to a second aspect of the present invention, there is provided a computer system comprising: a pressure sensitive tablet; a controller for detecting a tap on the pressure sensitive tablet performed by a pen to generate position data corresponding to the detected tap; a driver for adding event data showing a mouse function to the generated position data; and a general-purpose operating system running in the computer system, and having a first interface for executing a process corresponding to input position data in accordance with the event data and a second interface for interfacing with an application executed in the computer system, wherein the first interface detects a tap of a predetermined area in accordance with position data, and the driver changes event data to be added to position data corresponding to a tap to be detected continuously after the detected tap.

By use of such a system and an apparatus, even in a computer system having a general-purpose operating system with a GUI function mounted, a plurality of kinds of mouse functions, which the general-purpose OS has, can be emulated by only an operation on the pressure sensitive tablet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

An embodiment of the present invention will be explained with reference to the accompanying drawings.

Figure 1:
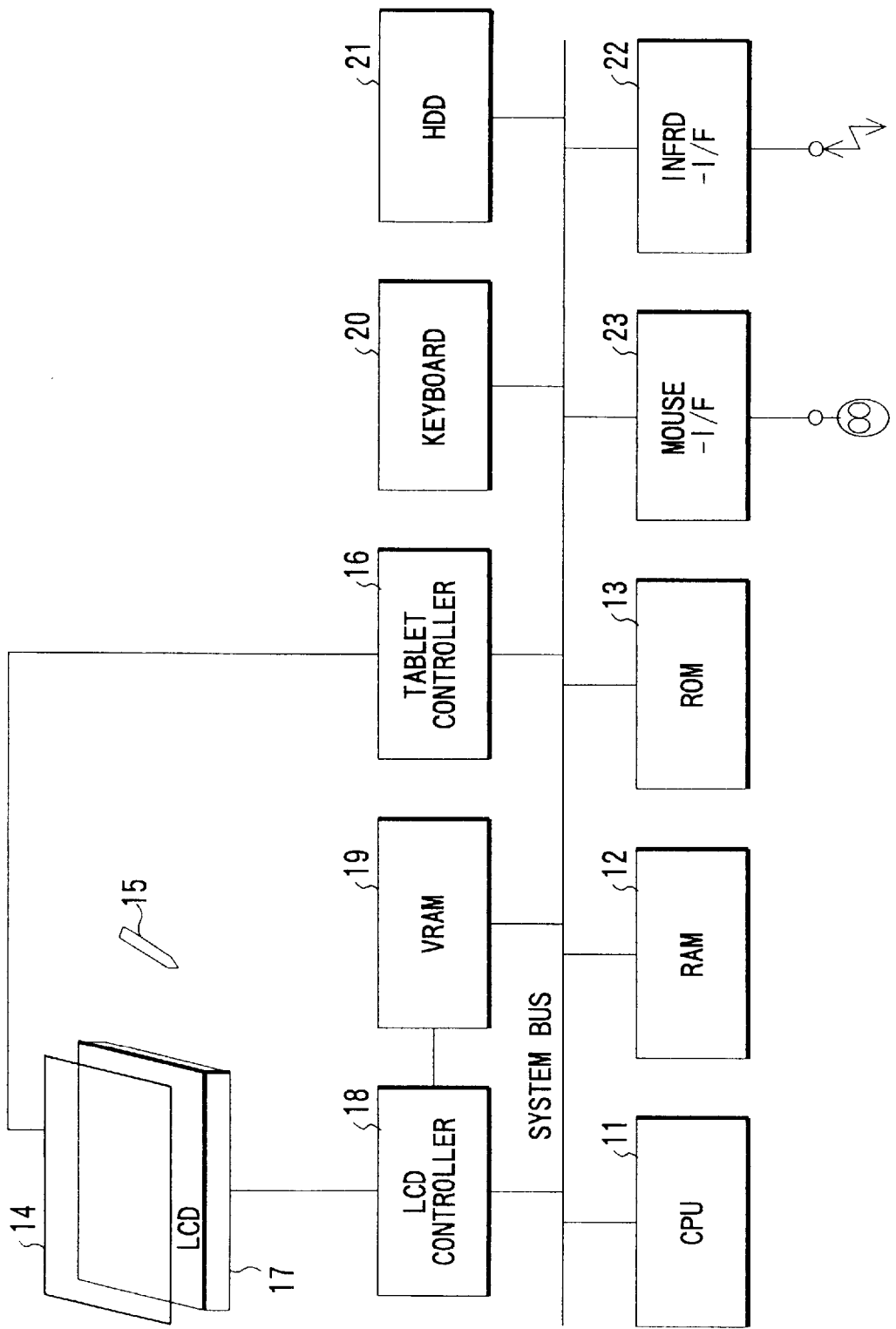
FIG. 1 is a block diagram showing the structure of a computer system according to an embodiment of the present invention.

FIG. 1 is a block diagram showing the structure of a portable computer system according to an embodiment of the present invention.

Figure 2:
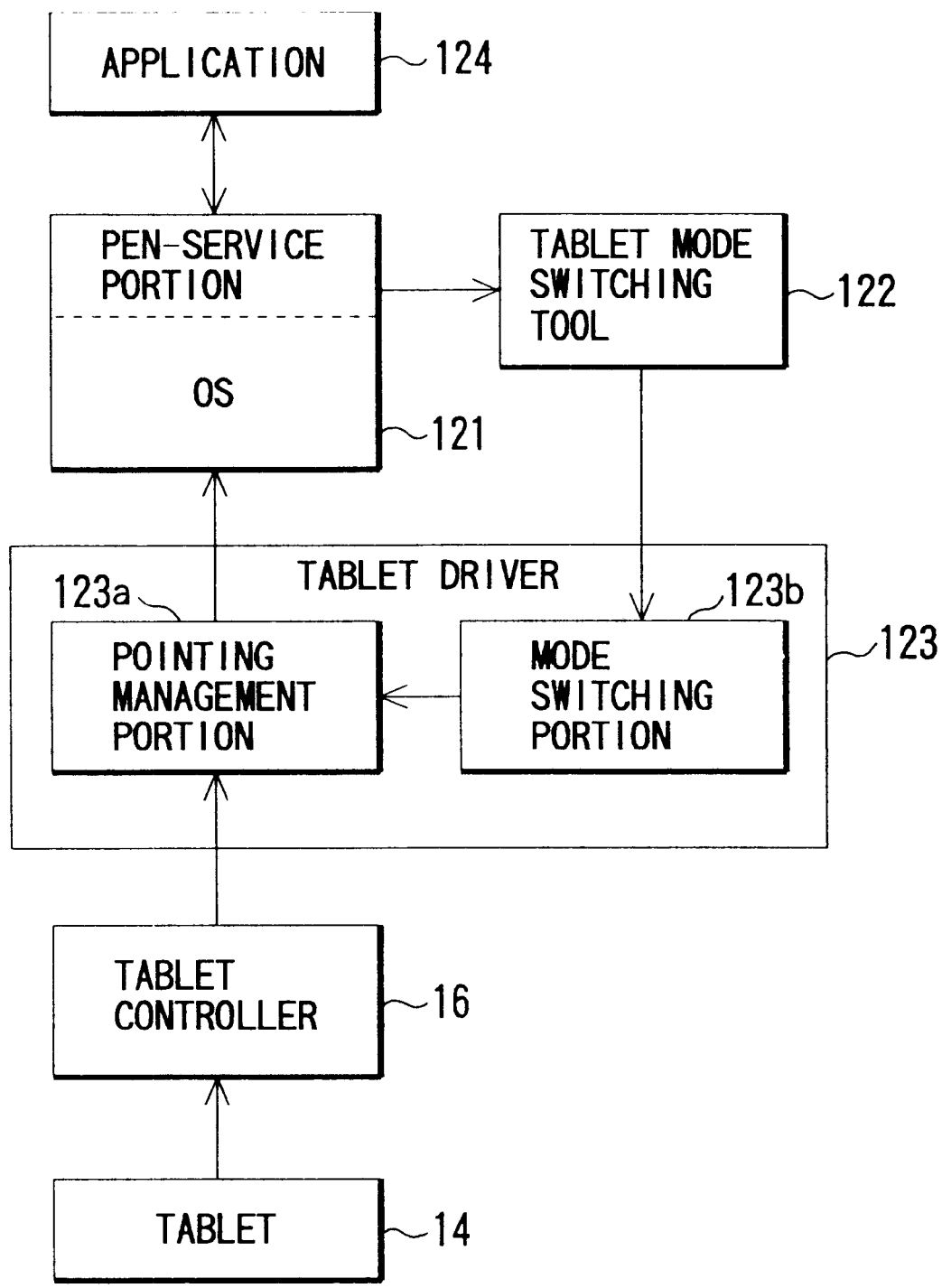
FIG. 2 is a block diagram showing the structure of a hardware and that of a software to emulate a plurality of kinds of mouse functions in the computer system shown in FIG. 1.

A CPU 11 controls the entire system and executes the process for emulating a plurality of kinds of mouse functions which a general-purpose OS (Operating System) has. A RAM (Random-Access Memory) 12 stores various kinds of programs, which are executed by the CPU 11. A working area, which is used in the processing of CPU 11, is allocated to the RAM 12, and data of processing is stored in the allocated working area. In RAM 12, as shown in FIG. 2, there are stored a general-purpose OS 121 having a pen-service OS, such as Windows 95 made by Microsoft Cooperation, a tablet mode switching tool 122 having a utility function of switch-controlling a tablet mode, various kinds of drivers including a tablet driver 123 for controlling the tablet, and an application program 124, which is operated on the general-purpose OS 121, etc.

A ROM (Read-Only Memory) 13 stores a plurality of programs such as a control program, which are executed by the CPU 11.

A transparent-type pressure sensitive tablet 14 and a liquid crystal display (LCD) section 17 forms an integrated display/input device. A touch pen 15 is used to input an operator's instruction on the pressure sensitive tablet 14. A tablet controller 16 outputs coordinate values x and y in accordance with a position of the tap (pen touch) position on the pressure sensitive tablet 14. A display controller 18 controls data to be displayed on the liquid crystal display section 17, the displaying data is stored in a memory (VRAM) 19 for display.

This computer system comprises a keyboard 20, a hard disk drive 21, an infrared communication port 22, and a mouse interface 23.

Next, the following will explain the functional structure relating to the emulate process of the mouse functions according to this embodiment with reference to FIG. 2.

In this embodiment, a mode for realizing the mouse function of the general-purpose OS (Operating System) by use of a click operation of a right-side mouse button is hereinafter called a side button mode corresponding to an input mode by a side button operation of an electromagnetic induction type tablet. A mode for realizing a function of moving a mouse cursor (mouse pointer) is hereinafter called a floating mode.

The tablet 14 detects a tap which the operator performs with the touch pen 15. The tablet 14 notifies the tap operation to the tablet controller 16. The tablet controller 16 sends the tapped coordinate values x and y to a tablet driver 123 in response to the notification.

As shown in FIG. 2, the tablet driver 123 comprises a pointing management portion 123a and a mode switching portion 123b. The mode switching portion 123a adds event data to coordinate values x and y sent from the tablet controller 16 and sends the event data and the coordinate values x and y to the OS 121. In this case, event data indicates that the added coordinate values x and y which are tapped by the operator correspond to what function of the mouse functions. In this embodiment, there are three kinds of event data, "1" to "3." Specifically, the event data "1" indicates a function corresponding to the click of the left-side mouse button function, the event data "2" indicates the side button mode, and the event data "3" indicates the above floating mode. The pointing management portion 123a adds event data in accordance with the instruction sent from the mode switching portion 123b. In a case where there is no instruction from the mode switching portion 123b, the pointing management portion 123a adds event data "1" as a default.

If the coordinate values x and y are coordinate values x and y to which event data "1" is added and the coordinate values x and y are included in a mode switching area shown on the screen, a pen service portion of the OS 121 sends the coordinate values x and y to the tablet mode switching tool 122.

Figure 3:
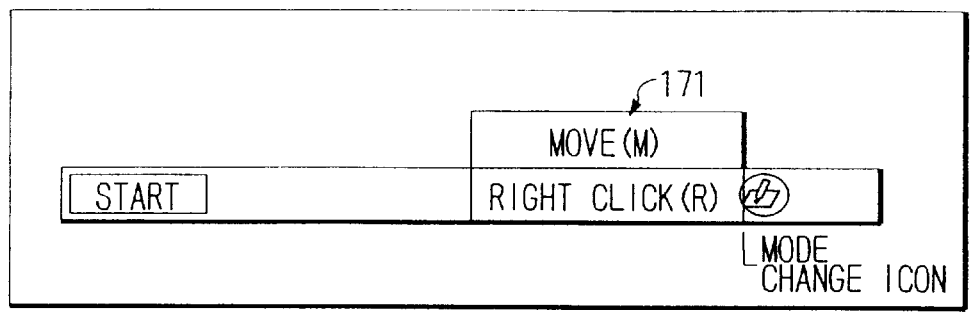
FIG. 3 is an example of a screen showing an area for indicating a mode change according to the embodiment of the present invention.
Figure 4A:
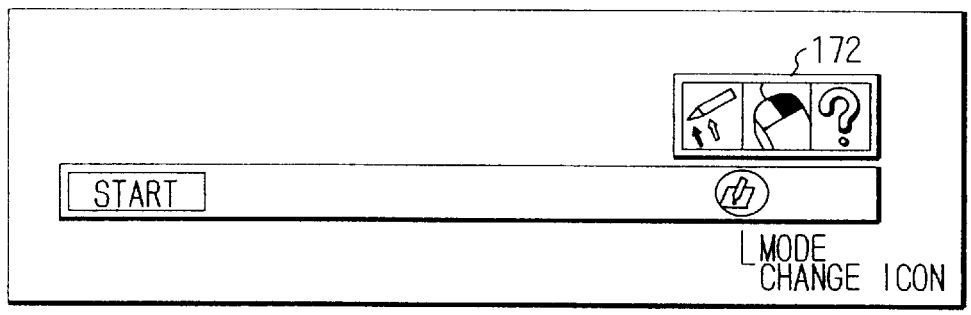
FIGS. 4A and 4B are examples of a screen showing an area for indicating a mode change according to the embodiment of the present invention.

In this case, as shown in FIG. 3, the mode switching area may be a menu area 171, which is displayed on a lower portion of the screen on the LCD 17 when a dedicated icon is tapped. Or, the mode switching area may be an area such as <RIGHT CLICK> button and <MOVE> button shown in FIG. 4B. The <RIGHT CLICK> button and <MOVE> button are included in a tool bar 172 as shown in FIG. 4A.

The tablet mode switching tool 122 determines whether or not the area, which shows the switching to either the side button mode or the floating mode, is tapped in accordance with the coordinate values x and y sent from OS 121. Then, the tablet switching tool 122 notifies the switching to the corresponding mode to the tablet driver 123.

The mode switching portion 123b controls event data in accordance with the notification from the tablet switching tool 122. In this case, controlling event data is added to coordinate values x and y to be input continuously after the coordinate values x and y by the pointing management portion 123a. Specifically, in the case of the switching to the side button mode, the mode switching portion 123b instructs the pointing device management portion 123a to add event data "2" to coordinate values x and y to be input continuously after the coordinate values x and y. In the case of the switching to the floating mode, the mode switching portion 123b instructs the pointing device management portion 123a to add event data "3" to the coordinate values x and y.

The pointing management portion 123 adds event data to the coordinate values x and y sent from the tablet controller 16 in accordance with the instruction of the mode switching portion 123b, and sends the added event data and the coordinate values x and y to the OS 121. In this case, the addition of event data ("2" or "3") to the coordinate values x and y is executed during tapping of the touch pen 15 onto the tablet 14. If the touch pen 15 is released once from the tablet 14, event data "1" as a default is added to the coordinate values x and y, which are sent just after the addition event data in accordance with the instruction from the mode switching portion 123b, again by the pointing management portion 123a.

The OS 121 executes a process, which corresponds to the coordinate values x and y, in accordance with event data, which is added to the coordinate values x and y sent from the tablet driver 123. Specifically, in the case of event data "1", the OS 121 executes a process, which corresponds to the coordinate values x and y, as a function corresponding to the click of the left-side mouse button. In the case of event data "2", the OS 121 executes a process corresponding to the click operation of the right-side mouse button, such as a short-cut function. In the case of event data "3", the OS 121 executes a move process of the mouse cursor.

Figure 5:
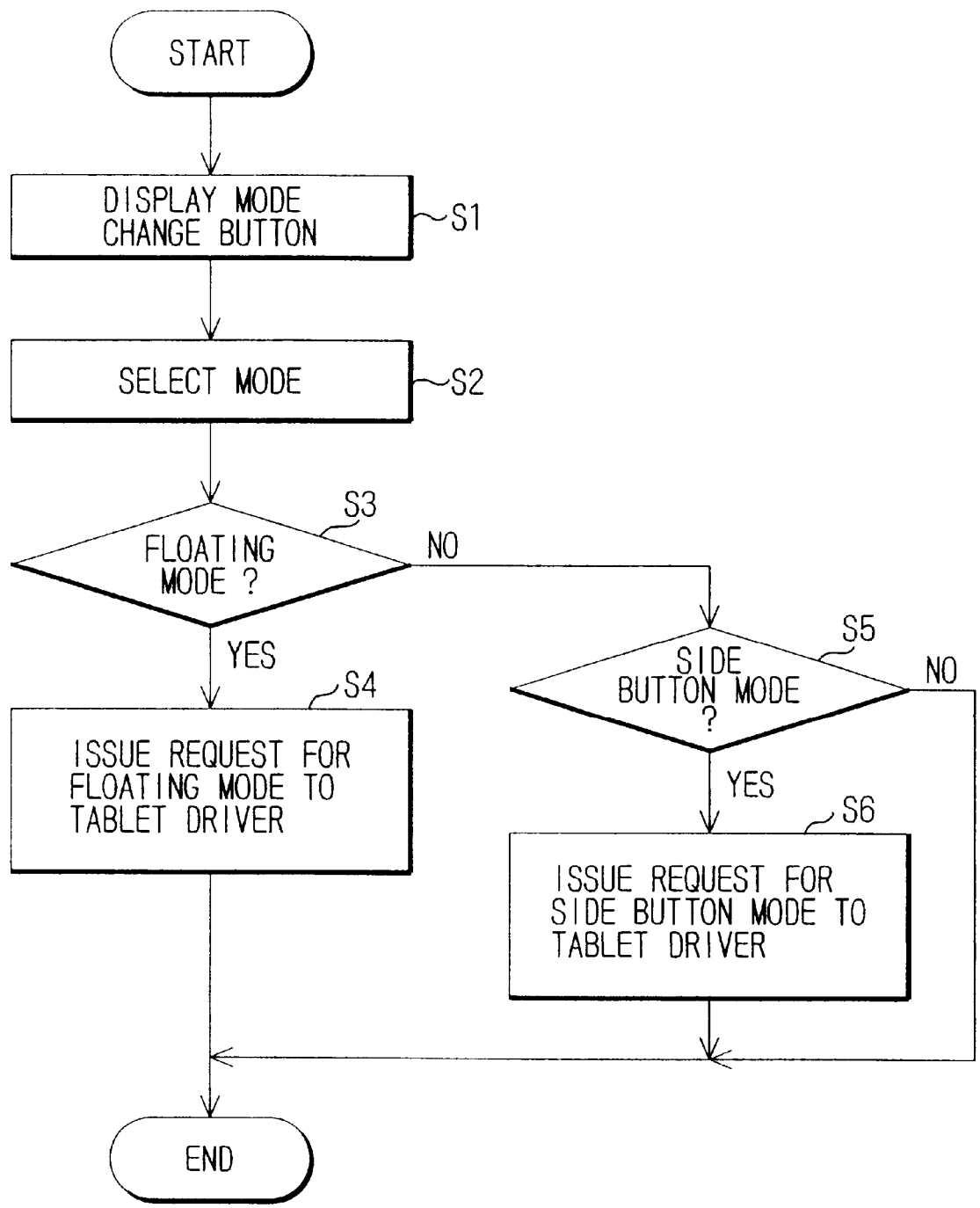
FIG. 5 is a flow chart showing a process for changing a mode.

Next, the following will explain a process operation for emulating a plurality of kinds of mouse functions, which the OS 121 has, with reference to FIG. 5.

It is assumed that an application having the mode switching areas (buttons) displayed is started, and the mode switching button is selective. The user taps the area showing the switching to the side button mode or the area showing the switching to the floating mode with the touch pen 15. As a result, either mode can be selected (steps S1, S2).

If the pressure sensitive tablet 14 is tapped with the touch pen 14, input coordinate values x and y, which correspond to the position tapped with the pen, are sent to the tablet driver 123 from the tablet controller 16.

Then, event data is added to the input coordinate values x and y sent to the tablet driver 123 by the pointing management portion 123a so as to be sent to the OS 121. In this case, there is no instruction from the mode switching portion 123b, and event data "1" (default) is added to the input coordinate values x and y.

Figure 4B:
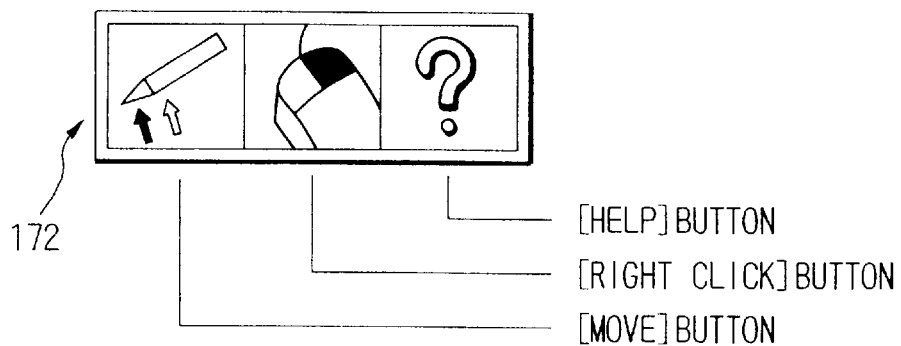

In the OS 121, the coordinate values x and y sent from the tablet driver 123 are processed in accordance with added event data. It is assumed that the coordinate values x and y sent from the tablet driver 123 is coordinate values to which event data "1" is added and the coordinate values x and y are included in the mode switching area displayed on the screen (FIGS. 3 to 4B). The coordinate values x and y are sent to the tablet mode switching tool 122 by the pen service portion of the OS 121.

In the tablet mode switching tool 122, it is determined whether the area showing the switching to the side button mode or the area showing the switching to the floating mode is tapped in accordance with the coordinate values x and y sent from the OS 121. Then, the instruction of the switching to the corresponding mode is notified to the tablet driver 123 (steps S3 to S6).

The mode switching portion 123b of the tablet driver 123 controls event data in accordance with the notification from the tablet switching tool 122. In this case, controlling event data is added to coordinate values x and y input continuously after the coordinate values x and y by the pointing management portion 123a.

Specifically, in the case of the switching to the side button mode, event data "2" is added to coordinate values x and y to be input continuously after the coordinate values x and y. In the case of the switching to the floating mode, event data "3" is added to the coordinate values x and y.

Similar to the case of the coordinate values x and y to which event data "1" is added, the coordinate values x and y to which event data ("2" or "3") is added are sent to the OS 121 in accordance with the instruction from the mode switching portion 123b.

In the OS 121, as mentioned above, the coordinate values x and y are processed in accordance with added event data. If added event data is "1", the OS 121 executes a process, which corresponds to the coordinate values x and y, as a function corresponding to the click of the left-side mouse button. If the added event data is "2", the OS 121 executes a process corresponding to the click operation of the right-side mouse button, such as a short-cut function. If the added event data is "3", the OS 121 executes a move process of the mouse cursor.

As mentioned above, event data "2" and "3" is continuously added by the pointing management portion 123a until the touch pen 15 is released from the tablet 14. Due to this, if the coordinate values x and y are further sent from the tablet controller 16, event data "1" as a default is added to the coordinate values x and y again so as to be sent to the OS 121.

According to the above-mentioned processing, only the movement of the mouse cursor and the click of the right-side mouse button can be emulated by only the operation on the pressure sensitive tablet 14.

The above embodiment explained that the emulation of only the movement of the mouse cursor and the click of the right-side mouse button could be executed among the mouse functions with which the general-purpose OS 121 dealt. However, the other mouse functions can be emulated by increasing the selection button of the other mouse functions.

The above embodiment explained the system structure of the portable information apparatus having the structural elements as shown in FIG. 1. However, the present invention is not limited to the above-mentioned embodiment. For example, the present invention can be applied to the computer system having the other structural elements such as the system in which the pressure sensitive tablet and the display device are separated from each other.

Moreover, the above embodiment explained that a command for switching the mode was displayed on the screen as a tool. However, the voice, etc. can be implemented as a trigger.

The present invention discloses the system in which the mode switching of the table can be realized by the tablet driver and the switching tool without changing the basic structure of the general-purpose OS so as to issue various kinds of events (movement of the mouse cursor, the click of the right-side mouse button).

On the other hand, in the technique described in Japanese Patent Application KOKAI Publication No. 7-334293, the display, the management, the discrimination, and the storage are managed by the mouse button to emulate the mouse button. Therefore, in the present invention, interface for switching the mode may not always be displayed on the screen.

Thus, according to the present invention, in the computer system on which the general-purpose OS having a GUI function is mounted, the plurality of kinds of mouse functions, which the general-purpose OS has, can be emulated by only the operation on the pressure sensitive tablet.

There can be provided a computer system in which the pressure sensitive tablet is used as a user interface and the plurality of kinds of mouse functions, which the general-purpose OS has, can be emulated.

There can be provided a portable information apparatus in which the general-purpose OS having the GUI function and the transparent-typed pressure sensitive tablet are combined and the plurality of kinds of mouse functions, which the general-purpose OS has, can be emulated by only the touch operation on the pressure sensitive tablet.

There can be provided a portable information apparatus in which the moving function of the mouse cursor (mouse pointer), which the general-purpose OS has, can be realized by only the touch operation on the pressure sensitive tablet.

There can be provided a portable information apparatus in which the mouse function with the click operation of the mouse button, which the general-purpose OS has, can be realized by only the touch operation on the pressure sensitive tablet.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

We claim:

1. A mouse function emulation method applied to a computer system having a tablet for executing an operating system, comprising the steps of:

detecting a tap on a predetermined area of said tablet performed by a pen, wherein an object indicating at least one of a plurality of mouse functions is displayed in said predetermined area, and said plurality of mouse functions include a function of merely moving a cursor to a position of said detected tap without drag operation;

determining presence of a mode selection by detecting the tap of the predetermined area on the tablet, each mode indicating at least one of said plurality of mouse functions;

continuously adding, when said mode selection is present, event data, indicating one of the plurality of mouse functions and corresponding to the selected mode, to position data of a tap detected after said detected tap; and executing a process in response to the position data using said operating system in accordance with said event data to emulate the mouse function, wherein said process is executed until another mode is determined.

2. The emulation method according to claim 1, wherein said plurality of mouse functions further include a function of clicking a right-side mouse button.

3. The emulation method according to claim 1, wherein said plurality of mouse functions further include a short-cut function.

4. The emulation method according to claim 1, wherein said event data adding step includes a sub-step of clearing the mode selection after adding event data, corresponding to said selected mode, to position data of the tap detected.

5. A computer system comprising:

a tablet;

a controller for detecting a tap on a predetermined area of said tablet performed by a pen to generate position data corresponding to the detected tap, wherein an object indicating at least one of a plurality of mouse functions is displayed in said predetermined area, and said plurality of mouse functions include a function of merely moving a cursor to a position of said detected tap without drag operation;

a driver for adding, when a mode selection is present, event data, indicating one of the plurality of mouse functions, to the generated position data, each mode indicating at least one of the plurality of mouse functions; and an operating system running in said computer system, and having a first interface for executing a process corresponding to input position data in accordance with said event data and a second interface for interfacing with an application executed in said computer system, wherein said first interface determines presence of the mode selection by detecting a tap of the predetermined area on the tablet, and said driver changes event data to be added continuously to position data corresponding to a tap detected after said detected tap, wherein said process is executed until another mode is selected.

6. The computer system according to claim 5, wherein said plurality of mouse functions further include a drag function.

7. The computer system according to claim 5, wherein said plurality of mouse functions further include a drag function and a function of clicking a right-side mouse button.

8. The computer system according to claim 5, wherein said plurality of mouse functions further include a drag function and a short-cut function.

9. The computer system according to claim 5, wherein said driver adds data, showing a click of a left-side mouse button as default event data, and event data different from said default, and clears said event data.

10. A computer system comprising:

a display;

a tablet provided on the display;

a tablet controller for detecting a tap on a predetermined area of the tablet performed by a pen to generate position data corresponding to the detected tap;

a display controller for displaying an object indicating at least one of a plurality of mouse functions, wherein said plurality of mouse functions include a function of merely moving a cursor to a position of said detected tap without drag operation; and a control section for receiving the position data and executing said plurality of mouse functions, based on the position data, if the displayed object is tapped, wherein said executing continues until another displayed object is tapped.

11. The computer system according to claim 10, wherein said plurality of mouse functions further include a function of clicking a right-side mouse button.

12. The computer system according to claim 10, wherein said plurality of mouse functions further include a function of resetting a function executed by the control section.

13. A mouse function emulation method applied to a computer system having a display and a tablet provided on the display, the method comprising the steps of:

detecting a tap on a predetermined area of the tablet performed by a pen to generate position data corresponding to the detected tap;

displaying an object indicating at least one of a plurality of mouse functions, wherein said plurality of mouse functions include a function of merely moving a cursor to a position of said detected tap without drag operation; and receiving the position data and executing one of said plurality of mouse functions, based on the position data, if the displayed object is tapped, wherein said executing continues until another displayed object is tapped.

14. The method according to claim 13, wherein said plurality of mouse functions further include a function of clicking a right-side mouse button.

15. The method according to claim 13, wherein said plurality of mouse functions further include a function of resetting a function executed in the receiving step.

* * * * *